S. E. Grout,
Towel Drier.
No. 99,668. Patented Feb. 8, 1870.
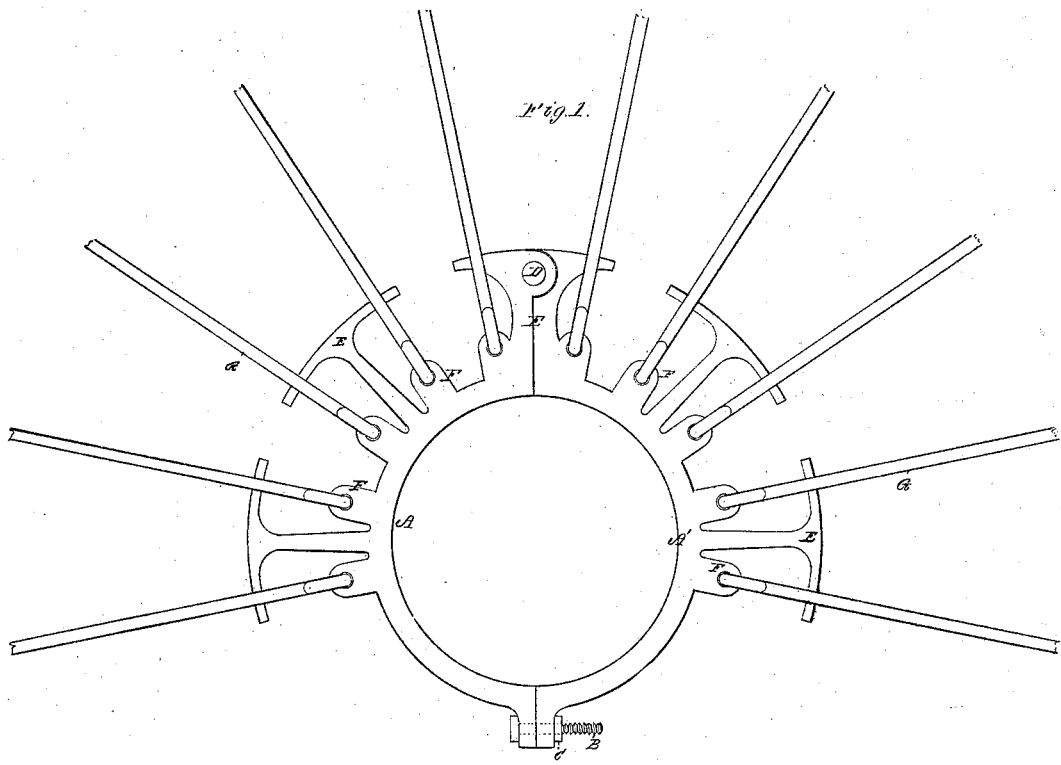
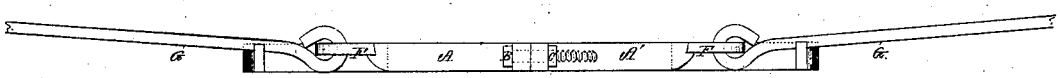
Witnesses          Selim E. Grout
                   by his attorney

United States Patent Office.

SELIM ELIJAH GROUT, OF WEST CONCORD, VERMONT.

Letters Patent No. 99,668, dated February 8, 1870.

IMPROVED TOWEL-DRIER.

The Schedule referred to in these Letters Patent and making part of the same.

*To all persons to whom these presents may come:*

Be it known that I, SELIM ELIJAH GROUT, of West Concord, of the county of Essex, and State of Vermont, have invented an Improved Towel-Drier; and do hereby declare the same to be fully described in the following specification, and represented in the accompanying drawings, of which—

Figure 1 denotes a top view, and
Figure 2, a rear elevation of it.

The apparatus is an improvement with reference to the towel-drier represented in Letters Patent No. 87,843, dated March 16, 1869, and granted to me.

Although I employ the sectional clamp, formed of two parts hinged together, and also employ, in connection therewith, two series of arms, I apply the latter and their supports to the clamp, and construct them in a manner different from what is the case with respect to the two series of levers, as described in my said patent.

By my present improvement I am enabled to dispense with the supporting-rails and hooks employed to hold the levers, and also, in the place of levers, to make use of simple arms, hinged respectively to ears projecting from the two parts of the clamp-ring.

From between each pair of such ears, I project a T-piece, to constitute a support for the next adjacent pair of arms, the middle T-piece being formed in two parts, hinged together.

In the drawings—

A A' are the two halves or parts of the clamp, which, when in use, are to embrace and be secured to the upright funnel of a stove, the two parts A A' being held thereto by a clamp-screw, B, and a nut, C, arranged therewith in manner as represented.

The hinge of the two portions A A' is shown at D, as formed in the middle T-piece E, which I construct in separate parts, each projecting from one of the halves of the clamp.

The series of ears is shown at F, and the T-pieces at E. The ears extend radially from the clamp, and are perforated to receive the arms, shown at G, which hook into the ears, or are hinged to them.

When projected outward, as shown in fig. 1, each pair of arms rests on one of the T-pieces, and in notches made therein, and when not in use the arms may be folded inward, diametrically across the clamp.

This mode of making the drier is much preferable to that described in my said patent, and takes up less room. When the drier is applied to a stove-funnel, its arms radiate from it, and serve to hold towels, or other articles which may be placed in them for the purpose of being either heated or dried by the heat radiated from the stove.

I claim the improved towel-drier, as made with the ears F, and T-pieces E, and the arms G, arranged together, and with the clamp A A', in manner as specified and represented.

SELIM ELIJAH GROUT.

Witnesses:
D. G. MAY,
C. K. KINNE.